United States Patent
Liu et al.

(10) Patent No.: US 10,877,488 B1
(45) Date of Patent: Dec. 29, 2020

(54) UNMANNED AERIAL VEHICLE (UAV) INTELLIGENT EMERGENCY VOICE REPORT SYSTEM AND METHOD

(71) Applicant: HONEYWELL INTERNATIONAL INC., Morris Plains, NJ (US)

(72) Inventors: Yang Liu, Shanghai (CN); Xueqian Song, Shanghai (CN); Jiaming Li, Shanghai (CN); Haifeng Wang, Beijing (CN)

(73) Assignee: HONEY WELL INTERNATIONAL INC., Charlotte, NC (US)

(*) Notice: Subject to any disclaimer, the term of this patent is extended or adjusted under 35 U.S.C. 154(b) by 0 days.

(21) Appl. No.: 16/433,454

(22) Filed: Jun. 6, 2019

(51) Int. Cl.
| | |
|---|---|
| G08B 23/00 | (2006.01) |
| G05D 1/10 | (2006.01) |
| G08G 5/00 | (2006.01) |
| B64C 19/02 | (2006.01) |
| B64C 13/24 | (2006.01) |

(52) U.S. Cl.
CPC .......... *G05D 1/101* (2013.01); *B64C 13/24* (2013.01); *B64C 19/02* (2013.01); *G08G 5/0013* (2013.01); *B64C 2201/146* (2013.01)

(58) Field of Classification Search
CPC ........ G05D 1/101; B64C 13/24; B64C 19/02; B64C 2201/146; G08G 5/0013
USPC ........................................ 340/963
See application file for complete search history.

(56) References Cited

U.S. PATENT DOCUMENTS

| | | | |
|---|---|---|---|
| 6,552,669 B2 | 4/2003 | Simon et al. | |
| 9,094,816 B2 | 7/2015 | Maier et al. | |
| 9,545,995 B1* | 1/2017 | Chau | B64C 39/024 |
| 9,555,883 B1* | 1/2017 | Navot | B64C 39/02 |
| 9,621,258 B2 | 4/2017 | Limbaugh et al. | |
| 2011/0035149 A1* | 2/2011 | McAndrew | G05D 1/0038 701/466 |
| 2015/0365159 A1* | 12/2015 | Bosworth | H04B 7/18502 455/11.1 |

(Continued)

FOREIGN PATENT DOCUMENTS

| | | |
|---|---|---|
| CN | 205510112 U | 8/2016 |
| CN | 108447482 A | 8/2018 |
| EP | 3267424 A1 | 1/2018 |

*Primary Examiner* — Naomi J Small
(74) *Attorney, Agent, or Firm* — Lorenz. & Kopf, LLP (57) ABSTRACT

An unmanned aerial vehicle intelligent emergency voice report system and method includes monitoring operational parameters of the UAV, monitoring environmental parameters within and external to the UAV, and processing the operational parameters and the environmental parameters, in a controller, to determine when the UAV is in an emergency condition. When the controller determines the UAV is in an emergency condition, the controller is used to: process the operational parameters to determine how the UAV will respond the emergency condition; automatically determine a communication transmission frequency; tune an onboard communication device to the communication transmission frequency; generate analog voice waveforms that provide information regarding the emergency condition; supply the analog voice waveforms to the onboard communication device; and command the onboard communication device to transmit the analog voice waveforms on the communication transmission frequency.

18 Claims, 7 Drawing Sheets

(56) References Cited

U.S. PATENT DOCUMENTS

2017/0021946 A1* 1/2017 Weller .................... G06F 11/00
2017/0136904 A1* 5/2017 Ricci ...................... B60L 53/35
2018/0033318 A1 2/2018 Yeh
2018/0294871 A1* 10/2018 Kosseifi ................ B64C 39/024
2019/0156685 A1 5/2019 Winkle et al.

* cited by examiner

UNMANNED AERIAL VEHICLE (UAV) INTELLIGENT EMERGENCY VOICE REPORT SYSTEM AND METHOD

TECHNICAL FIELD

The present invention generally relates to unmanned aerial vehicles (UAVs), and more particularly relates to a UAV intelligent emergency voice report system and method.

BACKGROUND

Unmanned aerial vehicles (UAVs) are increasingly being used, or are increasingly being planned for use. Currently, UAVs typically are allowed to be operated only within limited airspace, separate from the controlled airspace that is reserved for manned aircraft. In the near future, however, it is likely that UAVs may operate in mixed airspace with manned aircrafts. Though unlikely, certain scenarios are postulated in which a UAV may intrude into a controlled airspace. Such postulated scenarios include the UAV being in an emergency condition, such as degraded controllability or degraded navigation performance. During such emergency conditions, the UAV operator or systems onboard the UAV should, as soon as possible, notify air traffic control (ATC) and any manned aircraft in range that the UAV is in an emergency condition.

For a manned aircraft, during an emergency, pilots are required to act immediately to keep the aircraft stable, troubleshoot the cause, execute recovery procedures, select a forced landing area (if necessary), and squawk a specified transponder code (i.e., 7700). Pilots are also required to report emergency via an onboard voice communication (COM) radio to ATC and other aircraft in range, so that ATC and the other aircraft can know what the emergency is and the pilot's intent.

Normally, a UAV 106 is equipped with some sort of datalink connection between it and its ground station (or ground pilots) so that in the unlikely event of an emergency condition, it can communicate via the datalink connection. However, this configuration has certain drawbacks. For example, if the UAV loses communication with the remote operator, the UAV operator may not be aware, and hence neither ATC nor other aircraft in range will be aware. Even when the UAV is in communication with its remote operator, there is no communication network set up between UAV remote operators and ATC or manned aircraft. Thus, the UAV remote operator has no way of informing ATC or the other aircraft of any emergency condition.

Moreover, even if a communication network were set up between UAV remote operators and ATC, it would still be up to ATC to notify in-range manned aircraft of an emergency condition. This, too, exhibits drawbacks. For example, it would require additional equipment to set up a reliable and high-speed datalink between UAVs and UAV remote operators, and between UAV remote operators and ATC. It would rely on point-to-point communication rather than broadcasting to multiple receivers. It would require human effort, result in increased response times, and result in high workload. Furthermore, if the communication is provided via a datalink message, it is not as informative as a voice report. In general, a voice report is a more intuitive and faster communication method for line of sight communication.

Hence, there is a need for a system and method of intelligent reporting emergency conditions of a UAV via voice, while doing so in a manner that does not require additional equipment, can broadcast to multiple receivers, and does not require significant human effort. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system in an unmanned aerial vehicle (UAV) for determining and automatically reporting an emergency condition includes an onboard communication device and a controller. The onboard communication device is operable, in response to commands, to be tuned to one of a plurality of communication transmission frequencies and to transmit analog signals. The controller is in operable communication with the onboard communication device and is operable to: monitor operational parameters of the UAV; monitor environmental parameters within and external to the UAV; process the operational parameters and the environmental parameters to determine when the UAV is in an emergency condition, wherein an emergency condition is defined as one in which the UAV may impact other airborne traffic, entities on the ground, or the ground; and when the UAV is determined to be in an emergency condition, the controller is further operable to: process the operational parameters to determine how the UAV will respond the emergency condition; automatically determine a communication transmission frequency; tune the onboard communication device to the communication transmission frequency; generate analog voice waveforms that provide information regarding the emergency condition; supply the analog voice waveforms to the onboard communication device; and command the onboard communication device to transmit the analog voice waveforms on the communication transmission frequency.

In another embodiment, a method for operating an unmanned aerial vehicle (UAV) includes monitoring operational parameters of the UAV, monitoring environmental parameters within and external to the UAV, and processing the operational parameters and the environmental parameters, in a controller, to determine when the UAV is in an emergency condition, where an emergency condition is defined as one in which the UAV may impact other airborne traffic, entities on the ground, or the ground. When the controller determines the UAV is in an emergency condition, the controller is used to: process the operational parameters to determine how the UAV will respond the emergency condition; automatically determine a communication transmission frequency; tune an onboard communication device to the communication transmission frequency; generate analog voice waveforms that provide information regarding the emergency condition; supply the analog voice waveforms to the onboard communication device; and command the onboard communication device to transmit the analog voice waveforms on the communication transmission frequency.

In yet another embodiment, a system in an unmanned aerial vehicle (UAV) for determining and automatically reporting an emergency condition includes an onboard communication device, a plurality of operational parameter data sources, a plurality of environmental parameter data sources, and a controller. The onboard communication device is operable, in response to commands, to be tuned to one of a plurality of communication transmission frequencies and to transmit analog signals. Each operational parameter data source is operable to supply operational data representative of one or more operational parameters of the UAV, and each environmental parameter data source is operable to supply environmental data representative of one or more environmental parameters within and external to the UAV. The controller is in operable communication with the onboard communication device, the plurality of operational parameter data source, and the plurality of environmental data sources. The controller is operable to: monitor the operational parameters; monitor the environmental parameters; process the operational parameters and the environmental parameters to determine when the UAV is in an emergency condition, wherein an emergency condition is defined as one in which the UAV may impact other airborne traffic, entities on the ground, or the ground. When the UAV is determined to be in an emergency condition, the controller is further operable to: process the operational parameters to determine how the UAV will respond the emergency condition; automatically determine a communication transmission frequency; tune the onboard communication device to the communication transmission frequency; generate analog voice waveforms that provide information regarding the emergency condition; supply the analog voice waveforms to the onboard communication device; and command the onboard communication device to transmit the analog voice waveforms on the communication transmission frequency.

Furthermore, other desirable features and characteristics of the unmanned aerial vehicle intelligent emergency voice report system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
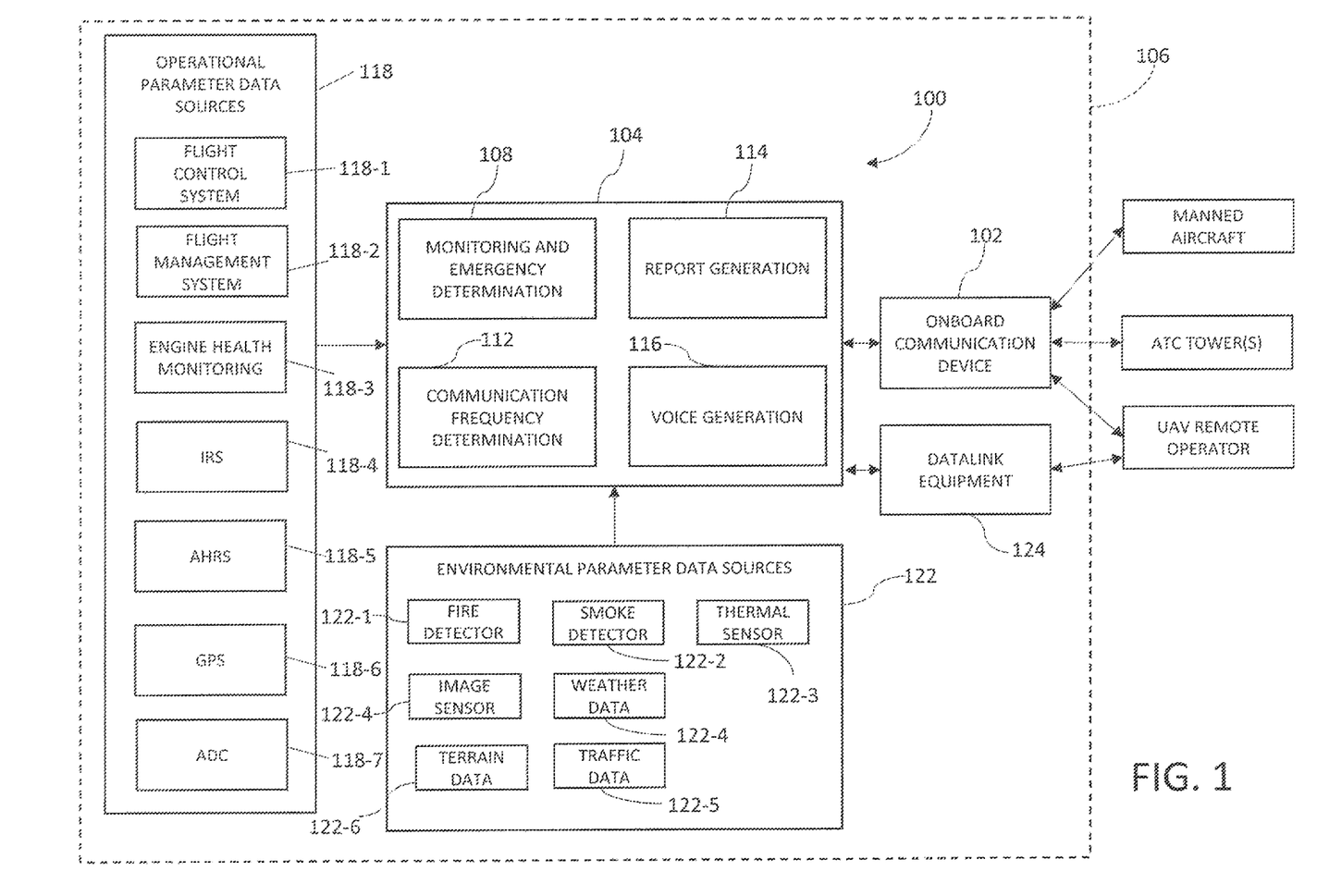
FIG. 1 depicts a block diagram of one example embodiment of an unmanned aerial vehicle (UAV) intelligent emergency voice report system.

Referring now to FIG. 1, a block diagram of one example embodiment of an unmanned aerial vehicle (UAV) intelligent emergency voice report system 100 is depicted. The example system 100 is configured to select a cruise level that maximizes the amount of time that an aircraft flies within a favorable jet stream, minimizes the amount of time the aircraft flies within an unfavorable jet stream, and/or select a cruise level that balances the amount of time the aircraft flies within favorable and unfavorable jet streams to achieve the most beneficial effect. The example system 100 includes an onboard communication device 102 and a controller 104, both of which are disposed on or in a UAV 106.

The onboard communication device 102 may be any one of numerous radio frequency communication devices that are operable to generate and transmit analog voice communications on a communication frequency. The onboard communication device 102 is tunable to various communication frequencies. Indeed, as will be described below, the onboard communication device 102 is responsive to commands it receives from the controller 104 to automatically tune itself to a commanded communication frequency. It will be appreciated that the onboard communication device 102 may be implemented using any one of numerous radio communication devices including, for example, any one of numerous low frequency (LF), high frequency (HF), very high frequency (VHF), and ultra-high frequency (UHF) communication devices, just to name a few non-limiting examples.

The controller 104 is in operable communication with at least the onboard communication device 102. The controller is operable to implement a monitoring and emergency determination module 108, a communication frequency tuning determination module 112, a report generation module 114, and a voice generation module 116. In one embodiment, the controller 102 may be implemented using at least one processor and a computer-readable storage device or media encoded with programming instructions for configuring the controller 102. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example monitoring and emergency determination module 108 is configured to monitor various operational parameters of the UAV 106 and monitor various environmental parameters within and external to the UAV 106. The example monitoring and emergency determination module 108 is further configured to process the operational parameters and the environmental parameters to determine whether the UAV 106 is in an emergency condition. When the example monitoring and emergency determination module 108 determines the UAV 106 is in an emergency condition, it processes the operational parameters to determine how the UAV 106 will respond to the emergency condition, and it also triggers at least the communication frequency tuning determination module 112 and the report generation module 114.

Before proceeding further, it is noted that, as used herein, an "emergency condition" is defined as one in which the UAV 106 may impact (1) other airborne traffic, (2) entities on the ground, or (3) the ground. It will be appreciated that various postulated scenarios could encompass this definition of emergency condition. Some examples include, but are not limited to: UAV controllability drops below a predetermined threshold for continued safe flight and landing, which is defined herein as the number of UAV control surfaces drops below the minimum number required for directional, lateral, and longitudinal maneuver capability for safe fight and landing (e.g., for a fixed-wing aircraft, a loss of rudder control; for a quad-rotor aircraft, a loss of two rotors on one side or a loss of two-axis control—meaning loss of two front/back/right/left rotors); navigation performance drops below the required navigation performance (RNP) for staying in the assigned containment area; total system error to the defined flight route, which includes navigation system error plus flight technical error (e.g., altitude error or cross track error) exceeds the boundary of the assigned airspace, so that remaining in the assigned airspace cannot be guaranteed; total loss of communication or loss of the control link between the UAV 106 and the operator for more than a defined threshold, which could be determined based on aircraft state, flight phase, type of airspace, terrain and the like (e.g., a UAV operating in a Class D airspace may have a smaller threshold than one operating in a uncontrolled Class G airspace); hazardous weather; potential collision with airborne on-the-ground traffic; potential collision with terrain or other obstacles; flight control surface (e.g., flaps and/or slats) failure on the final approach; failed or degraded engine; fire detected; fuel leak; and electrical power fault.

The operational parameters and the environmental parameters that the example monitoring and emergency determination module 108 monitors and processes may be supplied from various sources. For example, as FIG. 1 further depicts, the system 100 includes a plurality of operational parameter data sources 118 and a plurality of environmental parameter data sources 122. Each of the operational parameter data sources 118 is in operable communication with the controller 102 and is operable to supply operational data representative of one or more operational parameters. Similarly, each of the environmental parameter data sources 122 is in operable communication with the controller 104 and each is operable to supply environmental data representative of one or more environmental parameters. It will be appreciated that the number and type of operational parameter data sources 118 and the number and type of environmental parameter data sources 122 may vary. In the depicted embodiment, the operational parameter data sources 118 include at least a flight control system 118-1, a flight management system 118-2, an engine health monitoring system 118-3, an inertial reference system (IRS) 118-4, an attitude and heading reference system (AHRS) 118-5, a global positioning system 118-6, and an air data computer 118-7. In the depicted embodiment, the environmental parameter data sources 1xx includes one or more of a fire detector 122-1, a smoke detector 122-2, a thermal sensor 122-3, an image sensor 122-4, a weather data source 122-5, a traffic data source 122-6, and a terrain data source 122-7.

Just to provide some examples, the data supplied from flight control system 1xx-1 could be used to determine a loss of controllability of the UAV 106. The data supplied from the flight management system 118-2 will include information regarding the UAV flight route, the airspace corridor or the containment area that the UAV 106 should stay in. The data supplied from the flight management system 118-2 may also be used to compute navigation performance, such as the estimated position uncertainty (EPU) and provide an alert when it does not meet the RNP to stay in the containment area or when the UAV 106 is unexpectedly deviating from the flight route. The data supplied from one or more of the fire detector 122-1, the smoke detector 122-2, the thermal sensor 122-3, and the image sensor 122-4 may be used to determine the existence of an onboard fire. The data supplied from the image sensor 122-4, the traffic data source 122-6, and the terrain data source 122-7 may be used to monitor for potential traffic intruders and terrain/obstacles. The data supplied from the weather data source 122-5 may be used to monitor for inclement weather and/or turbulence.

Before proceeding further, it is noted that one or more other postulated abnormalities may occur that the example monitoring and emergency determination module 108 will not deem as an emergency condition. This is because these postulated abnormalities will not result in the UAV 106 impacting other airborne traffic, entities on the ground, or the ground. Some examples of such postulated abnormalities include, but are not limited to, a momentary loss of UAV position or communication (due, for example, to terrain or interference), and a loss of data recording function.

As noted above, the example monitoring and emergency determination module 108, upon determining the UAV 106 is in an emergency condition, processes the operational parameters to determine how the UAV 106 will respond the emergency condition. That is, what it is that the UAV 106 will do next, based on the current UAV status and the specific emergency condition. As may be appreciated, the response may be an automated corrective action generated by the UAV onboard systems, based on the current UAV status and the emergency type, or it may be a manual command received from a remote operator via datalink equipment 124.

Some non-limiting examples of emergency conditions for which the response would be an automated corrective may include an engine failure condition, a traffic conflict condition, a fire condition, and a go-around procedure condition. For an engine failure condition, the automated corrective action will include selecting a landing site, a glide path to the landing site, and a predicted time of impact at the landing site. For a traffic conflict condition, where an avoidance maneuver can be initiated, the automated corrective action will include a specified maneuver to avoid impact. For a fire condition, the automated corrective action may include a rapid descent to a crash site and a predicted time to impact. For the go-around procedure condition, the corrective action is initiation of the specified go-around procedure. If the UAV 106 is being controlled by a remote operator, the example monitoring and emergency determination module 108 knows how the UAV will respond by interpreting the manual command that the remote operator provides.

If there is no automated or manual corrective action, the example monitoring and emergency determination module 108 predicts how the UAV will respond based on current UAV status and the emergency type. Some non-limiting examples of emergency conditions where the example monitoring and emergency determination module 108 will predict a response include a low battery condition, a potential traffic conflict condition, and a loss of controllability condition. For the low battery condition, the predicted response would include, for example, the battery time remaining and for the UAV 106 to remain on its current heading. For the potential traffic conflict condition, where an avoidance maneuver is not (or cannot be) initiated, the predicted response would include, for example, the UAV 106 remaining on its current heading with an estimated time to impact. For the loss of controllability condition, where no corrective action can be taken, the predicted response would include, for example, time to, and position of, UAV impact.

The example communication frequency tuning determination module 112 is configured, upon receiving a trigger from the monitoring and emergency determination module 102, to determine a communication transmission frequency. As is generally known, a common emergency communication transmission frequency (e.g., 121.5 MHz) is reserved for emergency aircraft communications. However, when an aircraft (such as UAV 106) is in or near airspace that is covered by a specific ATC tower, it is preferred that aircraft report emergencies on the communication frequency of the ATC tower (ATC COM frequency), since not every aircraft or ATC tower will monitor the common emergency frequency. Thus, the example communication frequency tuning determination module 112 determines the communication transmission frequency based, for example, on the current UAV status and an airspace database 1xx that stores airspace information data and the air traffic control (ATC) tower information data. These data may include, for example, airspace information, airspace coverage for ATC towers, ATC tower identifiers, ATC COM frequencies and other information such ATC tower operation hours. The example communication frequency tuning determination module 112, upon determining the communication transmission frequency, transmits a command to the onboard communication device 102 that automatically tunes the onboard communication device 102 to the communication transmission frequency.

Figure 2:
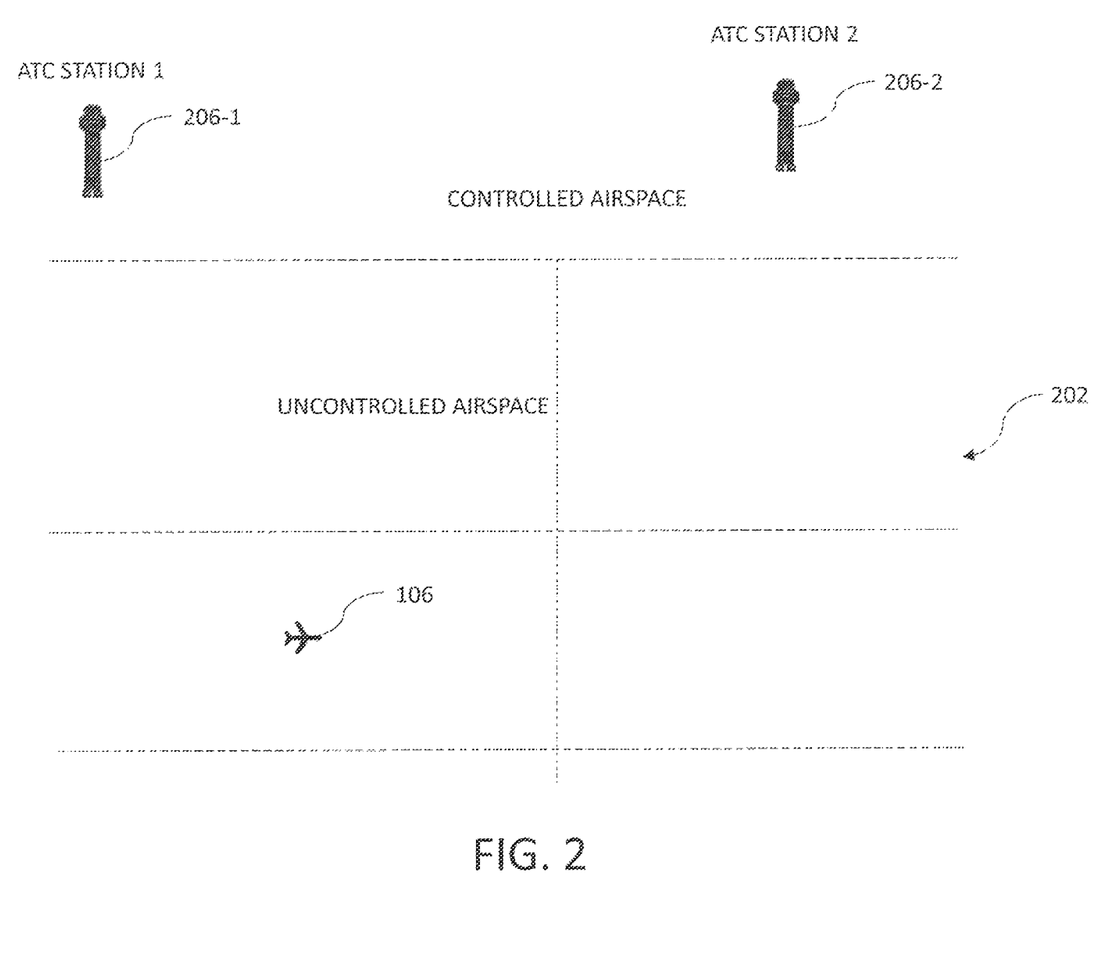
FIGS. 2-4 depict illustrative scenarios as to how the system of FIG. 1 determines a communication transmission frequency.
Figure 3:
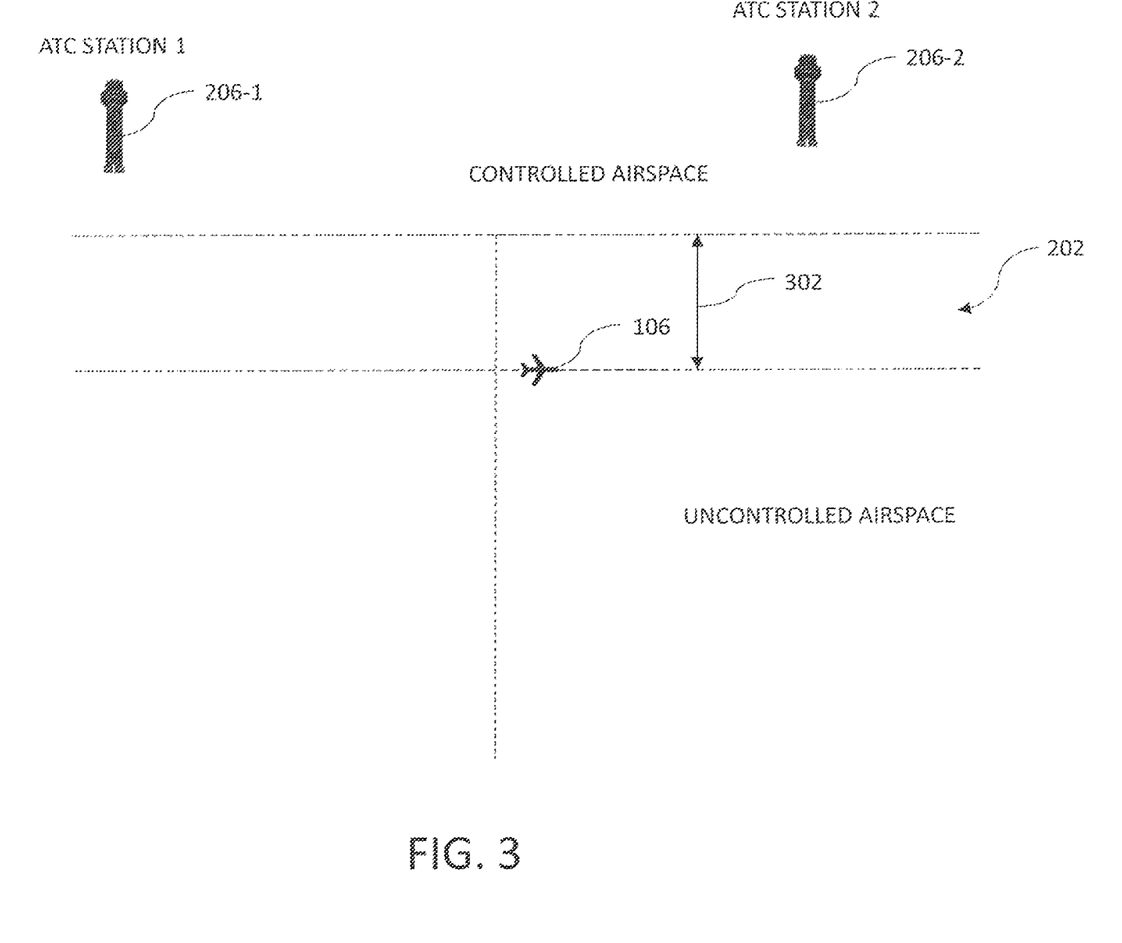
Figure 4:
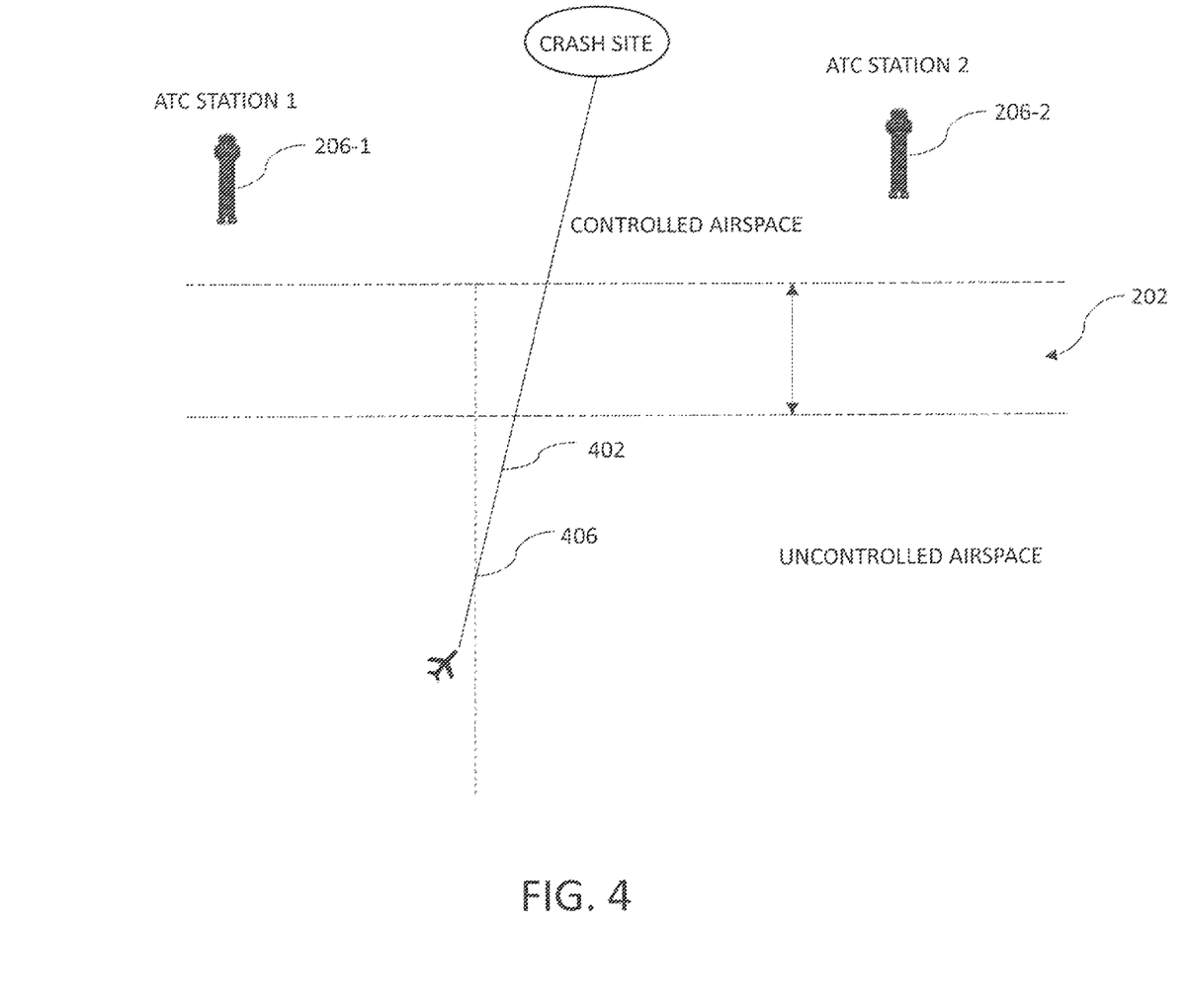

For completeness, some illustrative scenarios as to how the example communication frequency tuning determination module 112 determines the communication transmission frequency are depicted in FIGS. 2-4 and will now be described. Referring first to FIG. 2, the UAV 106 is shown in an uncontrolled airspace 202 and sufficiently far from a controlled airspace 204 where one or more ATC tower 206-1, 206-2 are located. In this scenario, the example communication frequency tuning determination module 112 will determine that the communication transmission frequency should be the common emergency communication transmission frequency (e.g., 121.5 MHz).

For the scenario depicted in FIG. 3, the UAV 106 is shown also in an uncontrolled airspace 202, but is within a defined distance 302, which could be determined based on aircraft state (e.g., altitude), the power of the radio transmitter, the terrain, and the like (e.g., a UAV cruising at a higher altitude with clean terrain around could have a longer radio transmission distance than a UAV cruising at a lower altitude with terrain around, hence the former will have a longer distance defined than the latter) of the controlled airspace 204. In this scenario, the example communication frequency tuning determination module 112 will determine that the communication transmission frequency should be the communication frequency of the ATC tower 206-2 that oversees the adjacent controlled airspace 204. This is because the UAV 106 is near the ATC tower during the emergency condition, and it will thus be more efficient to notify the ATC tower 206-2 (and any other aircraft operating in that airspace). As may be appreciated, if the UAV 106 is already in the controlled airspace 204, the example communication frequency tuning determination module 112 will also determine that the communication transmission frequency should be the communication frequency of the ATC tower 206-2 that oversees the adjacent controlled airspace 204.

The scenario depicted in FIG. 4 represents a case where the emergency condition is such that UAV 106 will need to enter into the controlled airspace 204. In this scenario, it is best that the ATC tower 206-2 be notified sufficiently early to give the ATC tower 206-2 time to clear the route 402 to a crash site 404. As depicted, at a predetermined position 406, for example, a position that is 10 minutes prior to the UAV 106 entering the controlled airspace 204, the example communication frequency tuning determination module 112 will tune the onboard communication device 102 to the communication frequency of the ATC tower 206-2.

It should be noted that during some scenarios, the communication transmission frequency may need to be changed. For example, it may need to be changed from the common emergency communication transmission frequency to an ATC COM frequency, or it may need to be changed from one ATC COM frequency to another ATC COM frequency as it traverses airspace. The example communication frequency tuning determination module 112 is also configured to automatically report the change in the communication transmission frequency change on the previous frequency, then report the emergency condition on the new frequency.

The example report generation module 114 is configured, upon example monitoring and emergency determination module 108 determining that the UAV 106 is in an emergency condition, to retrieve various types of data from various data sources and to generate a text-based report that includes information that may be useful to transmit from the onboard communication device 102. The various types of data that the example report generation module 114 retrieves may vary and may include, for example, data representative of at least the identity of the entity being contacted (e.g., air traffic control station, aircraft, etc.) by the onboard communication device 102 the UAV identification number and type (and/or color), the emergency type, current UAV status, and current UAV intention.

It will be appreciated that some of the data retrieved by the example report generation module 114 may be stored in memory or supplied from onboard systems, such as the previously described operational parameter data sources 1xx and/or the previously described environmental parameter data sources 1xx. The data representative of the emergency type and current UAV intention may be supplied from the monitoring and emergency determination module 108, as described above.

In some embodiments, the data retrieved by the example report generation module 114 may also include information specific to the emergency types. For example, if the UAV 106 is going to have to make a forced landing, the onboard fuel remaining and the onboard cargo could be useful for evaluating UAV impact. If the position of the UAV is unknown, the last known position and heading, the estimated position heading, and the estimated position uncertainty could be useful to report. For those embodiments in which the UAV 106 is equipped with image sensor equipment 122-4, images being sensed and recognized by the UAV 106 could also be retrieved and reported.

In view of the above, it will be appreciated that a complete text-based report that is generated by the example report generation module 114 may include at least the ATC tower identification, UAV identification and type (or color), the emergency type, the UAV current status, and the UAV response. In some instance, as just noted, it may also include additional information specific to the emergency type.

The example voice generation module 116 is configured to generate analog voice waveforms that provide information regarding the emergency condition, and to supply the analog voice waveforms to the onboard communication device 102. More specifically, it converts the text-based report generated by the example report generation module 114 into analog voice waveforms (e.g., speech). The example voice generation module 116 may implement any one of numerous techniques for generating the analog voice waveforms. Some example techniques include a voice response system and a text-to-speech (TTS) technique. The voice response system is more suitable for relatively simple scenarios and generates structured speech. However, it relies on a voice database, which may not cover all situations. The TTS technique is a relatively popular type of speech synthesis technique. It is able to "read out" any text it is provided. However, it relies on more advanced technology.

In a particular preferred embodiment, the example voice generation module 116 implements both the voice response system and the text-to-speech (TTS) technique. More specifically, the voice response system is used to implement the basic voice generator. However, if words are not in the associated database, the TTS technique is used. For completeness, each of these techniques will now be described.

Figure 5:
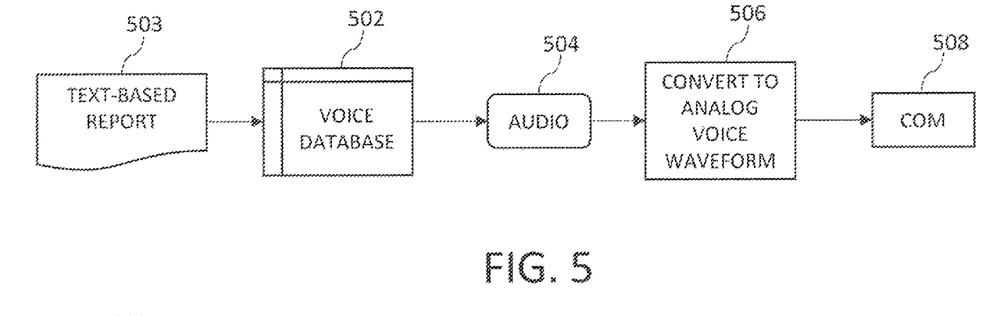
FIG. 5 depicts a functional block diagram of one embodiment of a voice response system that may be implemented in the system of FIG. 1.

As FIG. 5 depicts, and as was just noted, the voice response system 500 includes a voice database 502. The pronunciation of the words stored in the database are pre-recoded, in different languages. Corresponding analog voice waveforms will be generated based on the text-based emergency report 503. The voice waveforms of each text-based word are concatenated to generate a complete audio voice report 504. The audio report 504 is then converted to waveform 506 that is then supplied to the onboard communication device 102 for transmission.

Figure 6:
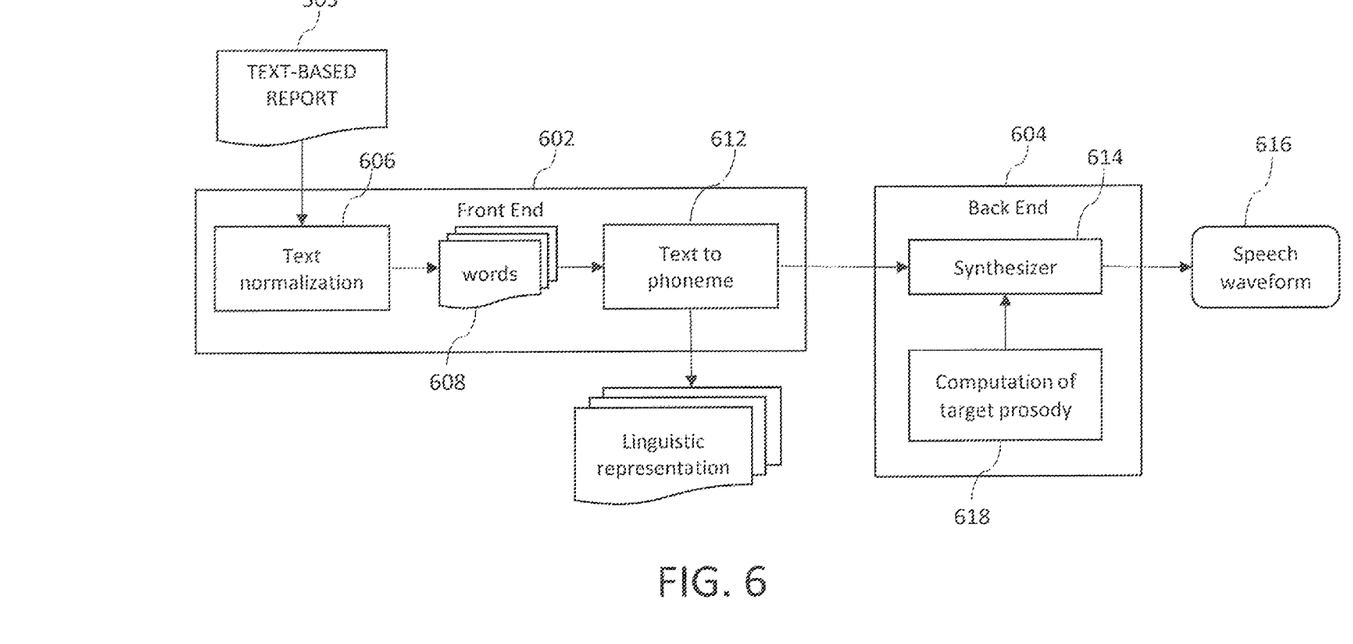
FIG. 6 depicts a functional block diagram of one embodiment of a text-to-speech system that may be implemented in the system of FIG. 1.

The example TTS system 600 that is depicted in FIG. 6 includes two sections—a front-end section 602 and back-end section 604. The text-based emergency report 503 is supplied to the front-end section 602. The text in the report first undergoes a normalization process 606, in which various symbols, such as numbers and abbreviations, are converted into raw text (e.g., "words") 608. The text is then converted to phonemes 612, at which point prosody information may also be added. This symbolic linguistic representation 613 is then supplied to the back-end section 604. The back-end section 604 includes a synthesizer 614, which converts the symbolic linguistic representation into analog voice waveforms 616. If the front-end section 602 provides prosody, the back-end section 604 will also implement a target prosody computation 618.

Figure 7:
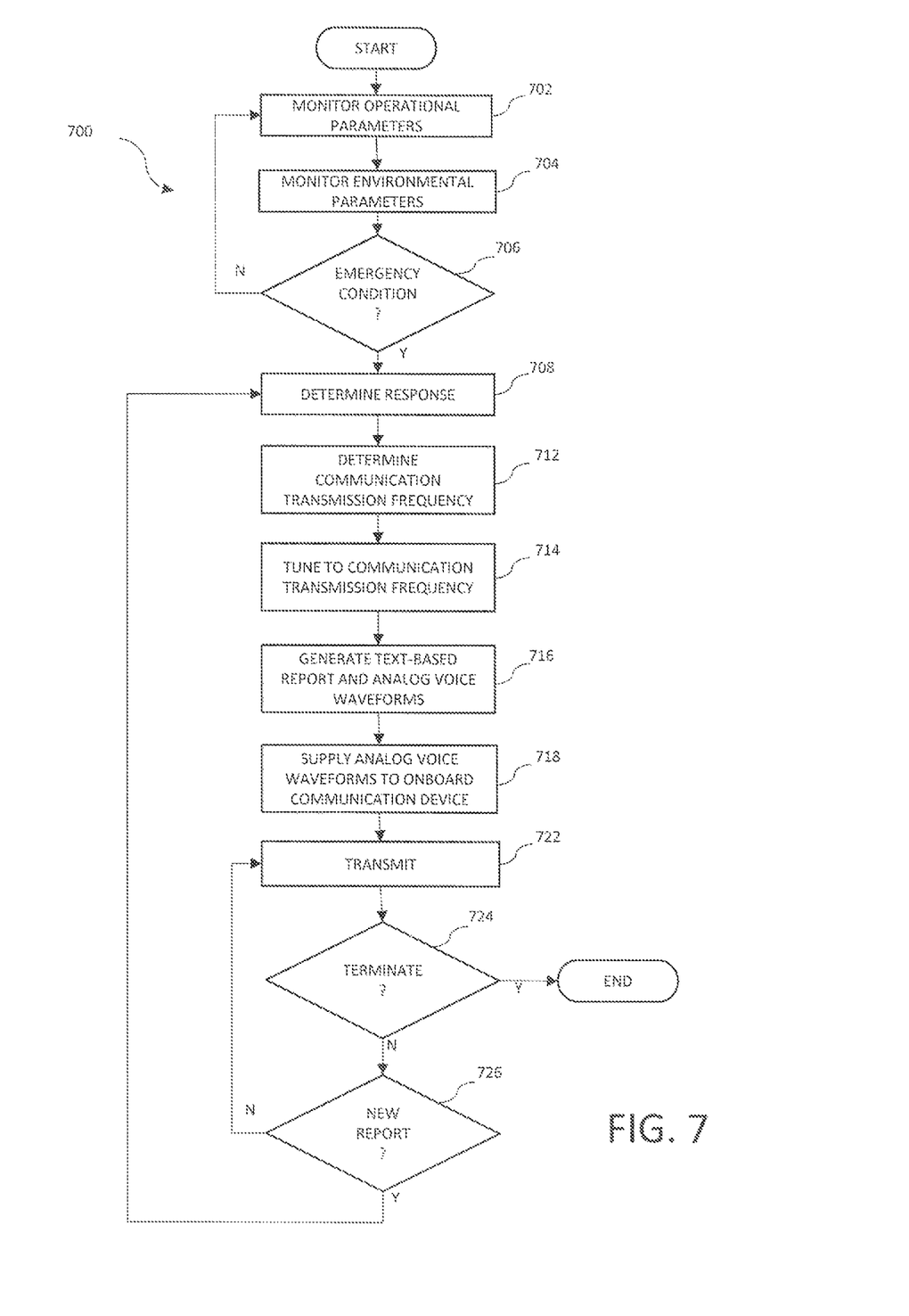
FIG. 7 depicts a process, in flowchart form, that the system of FIG. 1 implements to determine and report an emergency condition.

Turning now to FIG. 7, a process flowchart depicting an example process 700, implemented by the controller 104, for determining and reporting an emergency condition is provided. The example process 700 includes monitoring the operational parameters of the UAV 106 (702) and monitoring the environmental parameters within and external to the UAV 106 (704). The operational parameters and the environmental parameters are then process, as described above, to determine when the UAV 106 is in an emergency condition (706). If the UAV 106 is not in an emergency condition, the process 700 loops back to the monitoring steps. If, however, the controller 104 determines the UAV 106 is in an emergency condition, further steps of the process 700 are implemented.

The additional process steps include processing the operational parameters to determine how the UAV 106 will respond the emergency condition (708). The manner in which the controller 104 implements this process was described above. The communication transmission frequency on which the emergency report will be transmitted is then determined (712), and the onboard communication device 102 is commanded to tune to the communication transmission frequency (714). The analog voice waveforms that provide information regarding the emergency condition are then generated (716) and supplied the to the onboard communication device (718). The onboard communication device 102 is then commanded to transmit the analog voice waveforms on the communication transmission frequency (722).

In some embodiments, before the controller 104 commands the onboard communication device 102 to transmit, the controller 104 first determines if there is active communication going on at the communication transmission frequency. If so, then the controller 104 will wait for the active communication to cease before commanding the onboard communication device 102 to transmit. This is done to make sure that there will be no interference with the on-going communication. If there is no active communication, then the controller 104 will immediately command the onboard communication device 102 to transmit.

As FIG. 7 also depicts, after the controller 104 commands the transmission of the analog voice waveforms, it continues to monitor the operational and environmental parameters to determine if the voice report should be terminated (724). The conditions under which termination should occur may vary. Some non-limiting conditions include: the UAV 106 has landed or crashed; the UAV 106 recovered from the emergency condition and returned to its original route. When it is determined that the voice report should be terminated, the controller 104 generates a termination message, which includes the current UAV status, it also commands the onboard communication device 102 to transmit the termination message and terminates the reporting.

The example process 700 also includes determining if an event has occurred that will require a new report to be generated (726). Some examples of events that may require a new report include, but are not limited to: the UAV 106 recovers from the emergency; the UAV 106 recovers and returns back to the original route; the controller 104 determines that a communication transmission frequency change is required; a corrective action is determined or executed; there is a planned change in the flight profile; a new emergency condition has occurred; a defined time has lapsed since the last report, which could be determined based on the aircraft state (e.g., speed, flight phase, type of airspace and the like). As may be appreciated, a UAV in the cruise flight phase may have a longer time duration defined than when it is in the approach phase.

Some illustrative, but non-limiting, examples as to how the system 100 may implement the above-described process 700 for two different scenarios will, for completeness, now be described. It should be appreciated that numerous other scenarios, other than the scenarios described herein, are contemplated. These described scenarios are provided only to illustrate overall system behavior.

Figure 8:
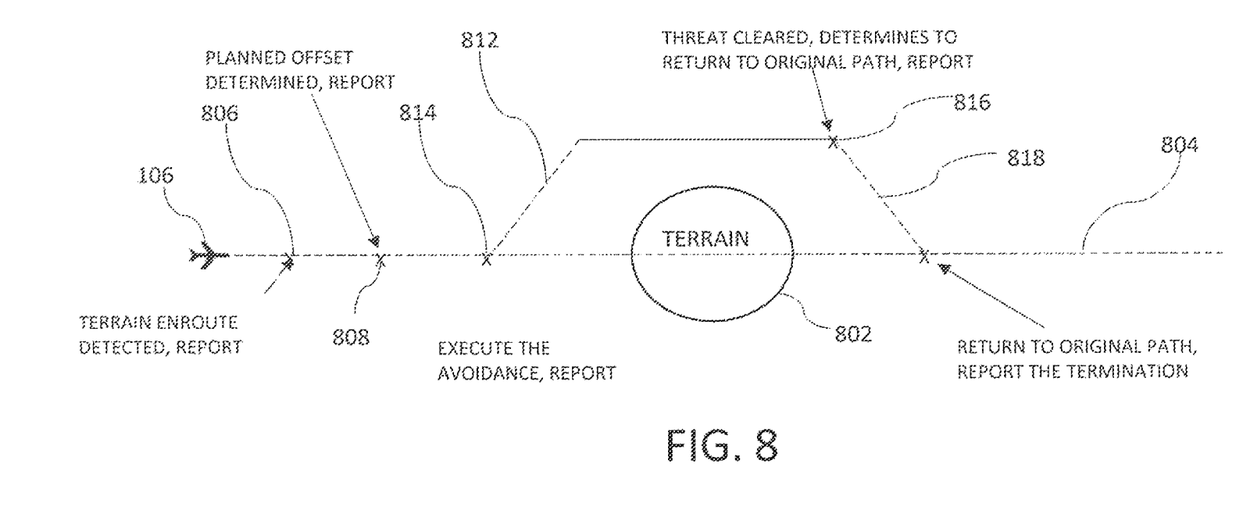
FIG. 8 depicts how the system of FIG. 1 may implement the process of FIG. 7 when unexpected terrain is detected along the planned flight path.

Referring to FIG. 8, a scenario is depicted in which unexpected terrain 802 along the planned flight path 804 is detected. Because the planned flight path 804 would result in the UAV 106 impacting the terrain 802, an emergency condition is determined and reported at a first position 806. As FIG. 8 also depicts, the system 100 determines, at a second position 808, an offset maneuver 812 that will allow the UAV 106 to avoid the terrain 802. Thus, the system 100 generates and transmits a report that includes the offset maneuver 812. At a third position 814, the UAV 106 executes and reports the offset maneuver 812. After executing the avoidance maneuver, and at a fourth position 816, where the threat is cleared, the system 100 determines a return maneuver 818 that will return the UAV 106 the original flight path 804, and generates and transmits a report that includes the return maneuver 818. Thereafter, when the UAV 106 returns to the original flight path 804, the system 100 generates and transmits a report and then terminates the report transmission.

Figure 9:
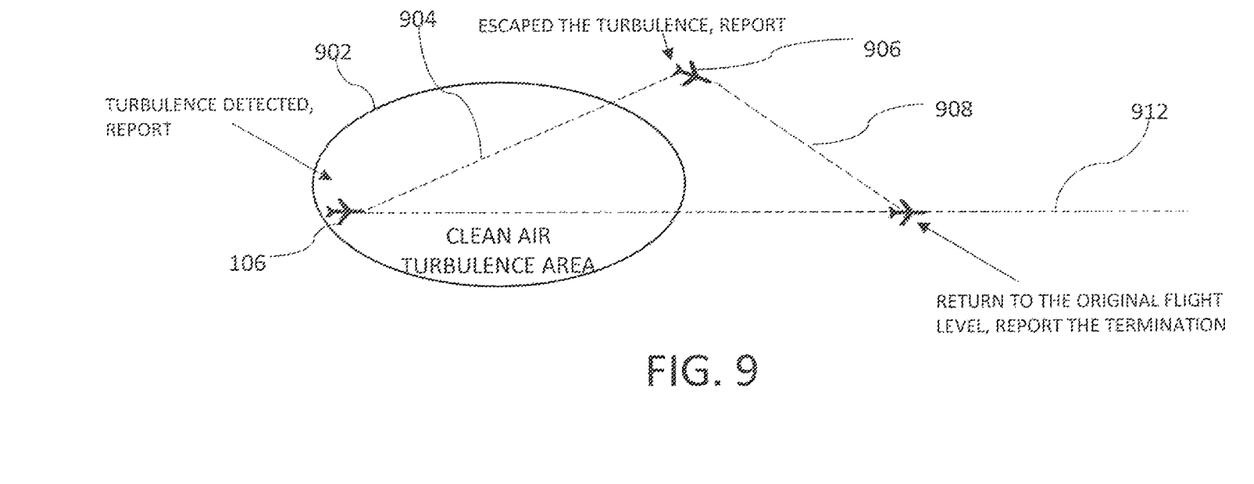
FIG. 9 depicts how the system of FIG. 1 may implement the process of FIG. 7 when the UAV is flying in an area of turbulence.

For another illustrative scenario, reference should now be made to FIG. 9. In this scenario, the system 100 detects that the UAV 106 is flying in an area of turbulence 902 and determines that required vertical separation cannot be maintained. It therefore reports this as an emergency condition. As FIG. 9 also depicts, the system 100 additionally determines an offset maneuver 904 that will allow the UAV 106 to escape the turbulence 902. Thus, the system 100 generates and transmits a report that includes the offset maneuver 904, and then executes and reports the offset maneuver 904. After executing the avoidance maneuver, and at a second position 906, where the UAV 106 is clear of the turbulence 602, the system 100 determines a return maneuver 908 that will return the UAV 106 the original flight path 912, and generates and transmits a report that includes the return maneuver 908. Thereafter, when the UAV 106 returns to the original flight path 912, the system 100 generates and transmits a report and then terminates the report transmission.

The system and method described herein intelligently reports emergency conditions of a UAV via voice, while doing so in a manner that does not require additional equipment, can broadcast to multiple receivers, and does not require significant human effort.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system in an unmanned aerial vehicle (UAV) for determining and automatically reporting an emergency condition, the system comprising:
   an onboard communication device operable, in response to commands, to be tuned to one of a plurality of communication transmission frequencies and to transmit analog signals;
   controller in operable communication with the onboard communication device and operable to:
      monitor operational parameters of the UAV;
      monitor environmental parameters within and external to the UAV;
      process the operational parameters and the environmental parameters to determine when the UAV is in an emergency condition, wherein an emergency condition is defined as one in which the UAV may impact other airborne traffic, entities on the ground, or the ground; and
      when the UAV is determined to be in an emergency condition, the controller is further operable to:
         process the operational parameters to determine how the UAV will respond the emergency condition;
         automatically determine a communication transmission frequency;
         tune the onboard communication device to the communication transmission frequency;
         generate analog voice waveforms that provide information regarding the emergency condition;
         supply the analog voice waveforms to the onboard communication device; and
         command the onboard communication device to transmit the analog voice waveforms on the communication transmission frequency.

2. The system of claim 1, wherein the controller determines how the UAV will respond from one of:
   preset automated corrective action commands associated with the emergency condition;
   manual commands transmitted from a remote transmitter and received by the controller; and
   current UAV operational status and the emergency condition.

3. The system of claim 1, wherein the controller is further operable to determine when to generate updated analog voice waveforms.

4. The system of claim 1, wherein the controller is further operable to determine when to command the onboard communication device to cease transmitting the analog voice waveforms on the communication transmission frequency.

5. The system of claim 1, wherein the controller is further operable to:

determine when to tune the onboard communication device to a new communication transmission frequency.

6. The system of claim 1, further comprising:
a plurality of operational parameter data sources in operable communication with the controller, each operational parameter data source operable to supply operational data representative of the operational parameters.

7. The system of claim 6, wherein the plurality of operational parameter data sources includes one or more of:
a flight control system, a flight management system, an engine health monitoring system, an inertial reference system (IRS), and attitude and heading reference system (AHRS), a global positioning system, and an air data computer.

8. The system of claim 1, further comprising:
a plurality of environmental parameter data sources in operable communication with the controller, each environmental parameter data source operable to supply environmental data representative of the environmental parameters.

9. The system of claim 8, wherein plurality of environmental parameter data sources includes one or more of:
a fire detector, a smoke detector, a thermal sensor, a camera, a weather data source, a traffic data source, and a terrain data source.

10. A method for operating an unmanned aerial vehicle (UAV), the method comprising the steps of:
monitoring operational parameters of the UAV;
monitoring environmental parameters within and external to the UAV;
processing the operational parameters and the environmental parameters, in a controller, to determine when the UAV is in an emergency condition, wherein an emergency condition is defined as one in which the UAV may impact other airborne traffic, entities on the ground, or the ground; and
when the controller determines the UAV is in an emergency condition, using the controller to:
process the operational parameters to determine how the UAV will respond the emergency condition;
automatically determine a communication transmission frequency;
tune an onboard communication device to the communication transmission frequency;
generate analog voice waveforms that provide information regarding the emergency condition;
supply the analog voice waveforms to the onboard communication device; and
command the onboard communication device to transmit the analog voice waveforms on the communication transmission frequency.

11. The method of claim 10, wherein determining how the UAV will respond is determined from one of:
preset automated corrective action commands associated with the emergency condition;
manual commands transmitted from a remote transmitter and received by the controller; and
current UAV operational status and the emergency condition.

12. The method of claim 10, further comprising determining when to generate updated analog voice waveforms.

13. The method of claim 10, further comprising determining when to command the onboard communication device to cease transmitting the analog voice waveforms on the communication transmission frequency.

14. The method of claim 10, further comprising determining when to tune the onboard communication device to a new communication transmission frequency.

15. A system in an unmanned aerial vehicle (UAV) for determining and automatically reporting an emergency condition, the system comprising:
an onboard communication device operable, in response to commands, to be tuned to one of a plurality of communication transmission frequencies and to transmit analog signals;
a plurality of operational parameter data sources, each operational parameter data source operable to supply operational data representative of one or more operational parameters of the UAV;
a plurality of environmental parameter data sources, each environmental parameter data source operable to supply environmental data representative of one or more environmental parameters within and external to the UAV;
a controller in operable communication with the onboard communication device, the plurality of operational parameter data source, and the plurality of environmental data sources, the controller operable to:
monitor the operational parameters;
monitor the environmental parameters;
process the operational parameters and the environmental parameters to determine when the UAV is in an emergency condition, wherein an emergency condition is defined as one in which the UAV may impact other airborne traffic, entities on the ground, or the ground; and
when the UAV is determined to be in an emergency condition, the controller is further operable to:
process the operational parameters to determine how the UAV will respond the emergency condition;
automatically determine a communication transmission frequency;
tune the onboard communication device to the communication transmission frequency;
generate analog voice waveforms that provide information regarding the emergency condition;
supply the analog voice waveforms to the onboard communication device; and
command the onboard communication device to transmit the analog voice waveforms on the communication transmission frequency.

16. The system of claim 15, wherein the plurality of operational parameter data sources includes one or more of:
a flight control system, a flight management system, an engine health monitoring system, an inertial reference system (IRS), and attitude and heading reference system (AHRS), a global positioning system, and an air data computer.

17. The system of claim 15, wherein plurality of environmental parameter data sources includes one or more of:
a fire detector, a smoke detector, a thermal sensor, a camera, a weather data source, a traffic data source, and a terrain data source.

18. The system of claim 15, wherein the controller is further operable, upon determining that the UAV is in an emergency condition, to:
determine when to generate updated analog voice waveforms;
determine when to command the onboard communication device to cease transmitting the analog voice waveforms on the communication transmission frequency; and determine when to tune the onboard communication device to a new communication transmission frequency.

\* \* \* \* \*